US010289401B1

(12) United States Patent
Gerraty (10) Patent No.: US 10,289,401 B1
(45) Date of Patent: May 14, 2019

(54) SYSTEMS AND METHODS FOR EFFICIENTLY DOWNGRADING OPERATING SYSTEMS INSTALLED ON NETWORK DEVICES

(71) Applicant: Juniper Networks, Inc., Sunnyvale, CA (US)

(72) Inventor: Simon J. Gerraty, Sunnyvale, CA (US)

(73) Assignee: Juniper Networks, Inc, Sunnyvale, CA (US)

(*) Notice: Subject to any disclaimer, the term of this patent is extended or adjusted under 35 U.S.C. 154(b) by 0 days.

(21) Appl. No.: 15/395,868

(22) Filed: Dec. 30, 2016

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC ..... G06F 8/60; G06F 8/61; G06F 8/62; G06F 8/65; G06F 8/656; G06F 8/658; G06F 9/4401; G06F 9/4406; G06F 9/445; G06F 9/44521; G06F 9/44536; G06F 21/57
USPC .................................................. 717/168–178
See application file for complete search history.

(56) References Cited

U.S. PATENT DOCUMENTS

| | | | | |
|---|---|---|---|---|
| 5,930,514 A * | 7/1999 | Thompson | ................ | G06F 8/62 707/999.202 |
| 6,167,567 A | 12/2000 | Chiles et al. | | |
| 6,332,198 B1 * | 12/2001 | Simons | .................... | G06F 1/14 370/217 |
| 6,622,302 B1 * | 9/2003 | Delaney | .................... | G06F 8/65 717/168 |
| 6,725,452 B1 * | 4/2004 | Te'eni | ...................... | G06F 8/61 717/168 |
| 6,742,134 B1 * | 5/2004 | Pothier | .................... | G06F 8/65 714/4.12 |

(Continued)

FOREIGN PATENT DOCUMENTS

WO WO 2013017925 A1 * 2/2013 ......... G06Q 20/1085

OTHER PUBLICATIONS

D. Agrawal, J. Giles, Kang-Won Lee, K. Voruganti and K. Filali-Adib, "Policy-based validation of SAN configuration," Proceedings. Fifth IEEE International Workshop on Policies for Distributed Systems and Networks, 2004. POLICY 2004., Yorktown Heights, NY, USA, 2004, pp. 77-86. (Year: 2004).*

(Continued)

*Primary Examiner* — Andrew M. Lyons
(74) *Attorney, Agent, or Firm* — FisherBroyles, LLP (57) ABSTRACT

The disclosed computer-implemented method may include (1) receiving, at a network node within a network, a request to downgrade a first version of an operating system that is currently active to a second version of the operating system that predates the first version of the operating system, (2) rebooting the network node to facilitate downgrading the first version of the operating system to the second version of the operating system, and (3) during the reboot, downgrading the first version of the operating system to the second version of the operating system by (A) reclassifying an active set of packages from the first version of the operating system as a previous set of packages and (B) executing a pending set of packages from the second version of the operating system. Various other methods, systems, and computer-readable media are also disclosed.

14 Claims, 6 Drawing Sheets

(56) References Cited

U.S. PATENT DOCUMENTS

| | | | | |
|---|---|---|---|---|
| 7,376,945 | B1* | 5/2008 | Kakumani | G06F 9/4416 717/171 |
| 7,461,374 | B1* | 12/2008 | Balint | G06F 8/658 717/174 |
| 9,098,371 | B2* | 8/2015 | Cordesses | G06F 9/44536 |
| 9,747,291 | B1* | 8/2017 | Mall | G06F 17/30082 |
| 9,753,718 | B1* | 9/2017 | Carter | G06F 8/65 |
| 2002/0042892 | A1* | 4/2002 | Gold | G06F 11/1417 714/6.11 |
| 2004/0015946 | A1* | 1/2004 | Te'eni | G06F 8/61 717/169 |
| 2004/0031029 | A1 | 2/2004 | Lee et al. | |
| 2004/0031030 | A1* | 2/2004 | Kidder | G06F 1/14 717/172 |
| 2006/0007944 | A1* | 1/2006 | Movassaghi | H04L 41/0813 370/401 |
| 2008/0155526 | A1* | 6/2008 | Gokhale | G06F 8/62 717/169 |
| 2010/0325167 | A1* | 12/2010 | Landry | G06F 11/1446 707/802 |
| 2011/0035740 | A1* | 2/2011 | Powell | G06F 8/656 717/170 |
| 2011/0225577 | A1* | 9/2011 | Wookey | G06F 8/658 717/175 |
| 2012/0079471 | A1* | 3/2012 | Vidal | G06F 8/65 717/169 |
| 2012/0317562 | A1* | 12/2012 | Wang | G06F 8/65 717/170 |
| 2014/0157251 | A1* | 6/2014 | Hocker | G06F 8/71 717/170 |
| 2015/0040155 | A1* | 2/2015 | Gutta | H04N 21/4181 725/31 |
| 2015/0317148 | A1* | 11/2015 | Ohashi | G06F 8/65 717/170 |
| 2016/0274888 | A1* | 9/2016 | Eliazer | G06F 8/658 |
| 2017/0034023 | A1* | 2/2017 | Nickolov | H04L 43/0817 |
| 2017/0046146 | A1* | 2/2017 | Jamjoom | G06F 8/62 |
| 2017/0163787 | A1* | 6/2017 | Xu | H04M 1/72525 |

OTHER PUBLICATIONS

S. Kubisch, R. Hecht, R. Salomon and D. Timmermann, "Intrinsic Flexibility and Robustness in Adaptive Systems: A Conceptual Framework," 2006 IEEE Mountain Workshop on Adaptive and Learning Systems, Logan, UT, 2006, pp. 98-103. (Year: 2006).*

Simon J. Gerraty; Systems and Methods for Efficiently Updating Software Installed on Network Devices; U.S. Appl. No. 15/378,774, filed Dec. 14, 2016.

* cited by examiner

SYSTEMS AND METHODS FOR EFFICIENTLY DOWNGRADING OPERATING SYSTEMS INSTALLED ON NETWORK DEVICES

BACKGROUND

Operating systems are often updated to fix certain software bugs and/or improve the performance of network devices. For example, an operating system running on a network device may receive an update that is intended to patch a newly discovered security vulnerability and/or improve the network device's performance. In this example, the operating system may then install the update in an effort to patch the security vulnerability and/or improve the network device's performance.

In some cases, a traditional update may have an unintended negative effect that creates a new security vulnerability and/or impairs a network device's performance in one way or another. As a result, the network device may have been better served to maintain the previous version of the operating system rather than install the update. Unfortunately, the traditional update may have initiated certain configuration changes in the network device that are not backwards compatible with the previous version of the operating system. Accordingly, the network device may be unable to downgrade to the previous version of the operating system after having installed the update, thereby leaving the negative effect intact.

The instant disclosure, therefore, identifies and addresses a need for systems and methods for efficiently downgrading operating systems installed on network devices.

SUMMARY

As will be described in greater detail below, the instant disclosure generally relates to systems and methods for efficiently downgrading operating systems installed on network devices. In one example, a computer-implemented method for efficiently downgrading operating systems installed on network devices may include (1) receiving, at a network node within a network, a request to downgrade a first version of an operating system that is currently active to a second version of the operating system that predates the first version of the operating system, (2) rebooting the network node to facilitate downgrading the first version of the operating system to the second version of the operating system, and (3) during the reboot, downgrading the first version of the operating system to the second version of the operating system by (A) reclassifying an active set of packages from the first version of the operating system as a previous set of packages and (B) executing a pending set of packages from the second version of the operating system.

As another example, a system for implementing the above-described method may include various modules stored in memory. The system may also include at least one physical processor that executes these modules. For example, the system may include (1) a receiving module that receives, at a network node within a network, a request to downgrade a first version of an operating system that is currently active to a second version of the operating system that predates the first version of the operating system, (2) a reboot module that reboots the network node to facilitate downgrading the first version of the operating system to the second version of the operating system, and (3) a downgrade module that downgrading the first version of the operating system to the second version of the operating system during the reboot by (A) reclassifying an active set of packages from the first version of the operating system as a previous set of packages and (B) executing a pending set of packages from the second version of the operating system.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) receive, at a network node within a network, a request to downgrade a first version of an operating system that is currently active to a second version of the operating system that predates the first version of the operating system, (2) reboot the network node to facilitate downgrading the first version of the operating system to the second version of the operating system, and (3) during the reboot, downgrade the first version of the operating system to the second version of the operating system by (A) reclassifying an active set of packages from the first version of the operating system as a previous set of packages and (B) executing a pending set of packages from the second version of the operating system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for efficiently downgrading operating systems installed on network devices. As will be explained in greater detail below, a router may have multiple sets of packages from different versions of an operating system installed at the same time. For example, a router may install an operating system and later update that operating system by applying a new set of packages to the operating system. In the event that the update had an unintended negative effect on the operating system and produced a configuration change that is not backwards compatible, an administrator may initiate a downgrade that involves reverting back to an earlier version of the operating system on the router.

In this example, the router may need to reboot to implement the downgrade. During the reboot, the router may reclassify the set of packages that was active as a result of the update by deactivating those packages and renaming them as a previous set. Additionally or alternatively, the router may activate the set of packages from the earlier version of the operating system by renaming those packages as a pending set and then booting from them. By doing so, the router may be able to revert back to the earlier version of the operating system without needing to uninstall the operating system altogether and then reinstall that earlier version. As a result, the router may be able to perform a downgrade of the operating system that is more efficient than traditional downgrades.

Figure 1:
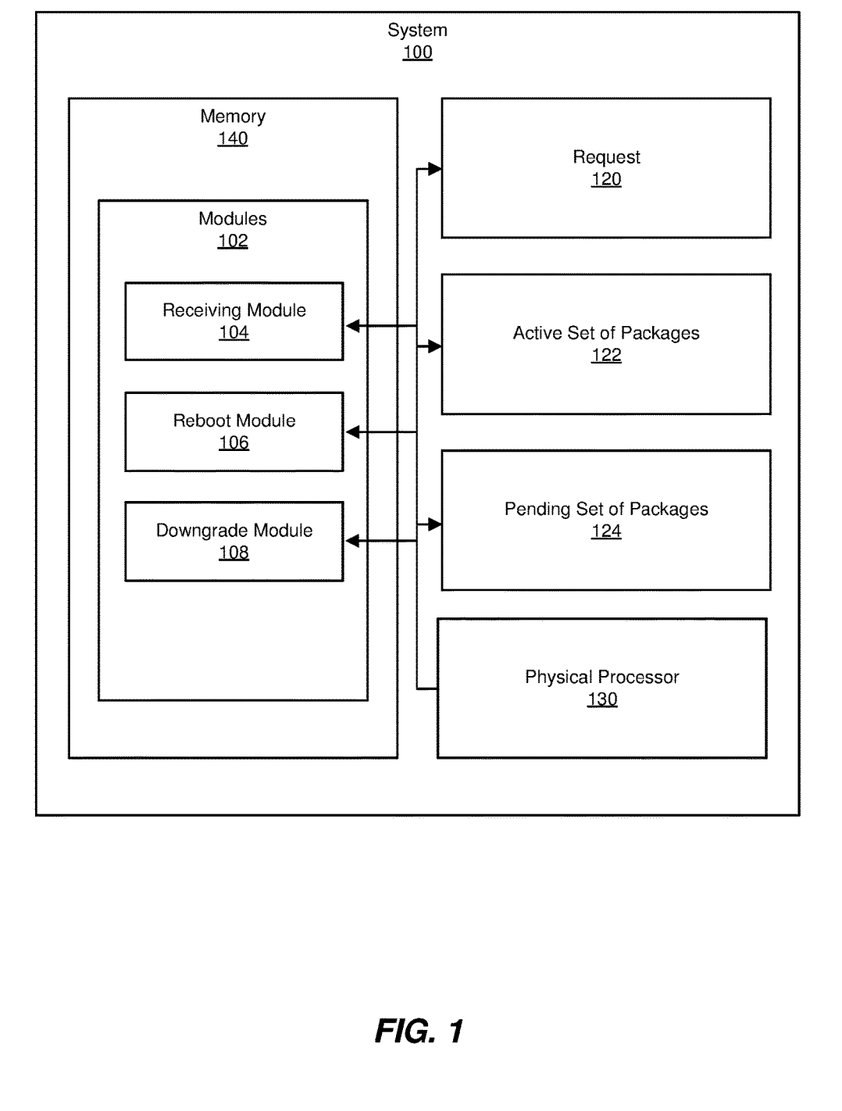
FIG. 1 is a block diagram of an exemplary system for efficiently downgrading operating systems installed on network devices.
Figure 2:
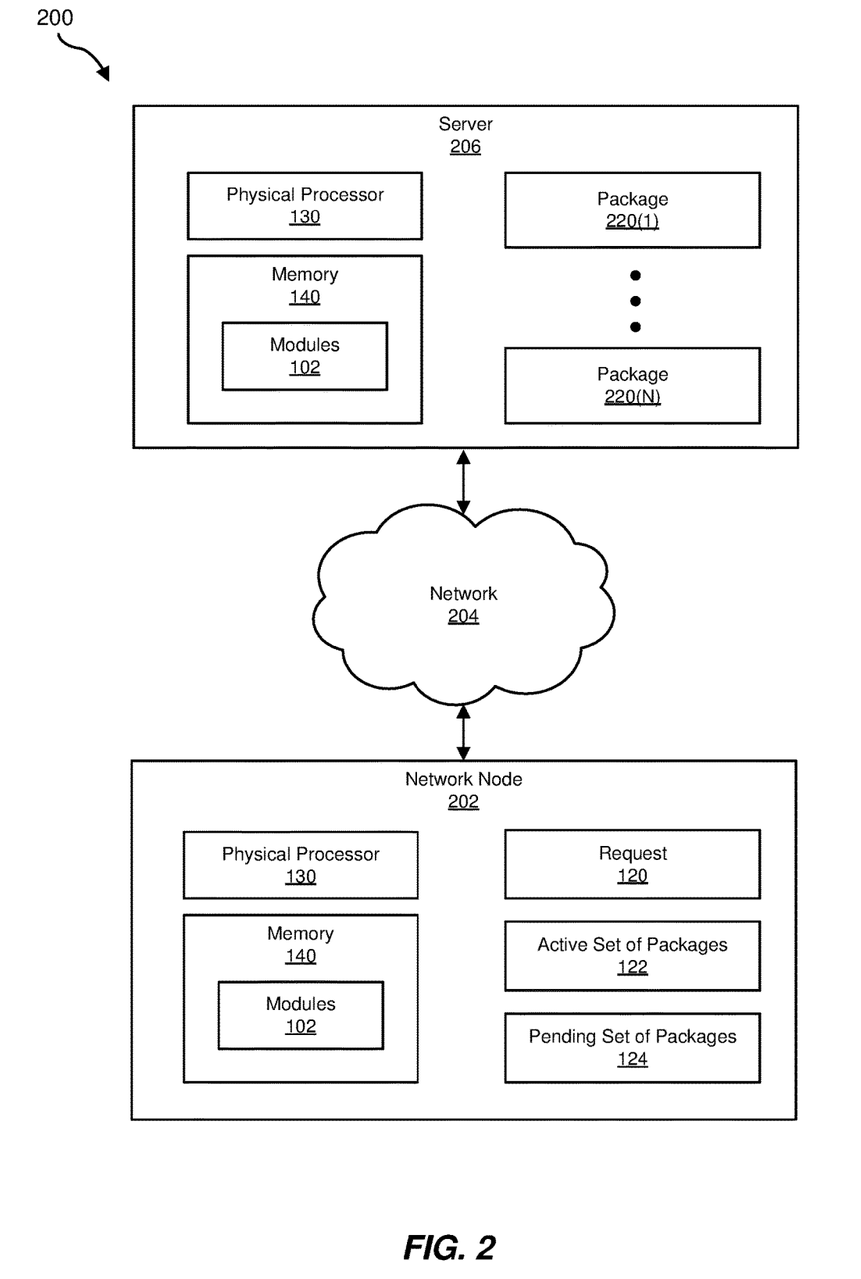
FIG. 2 is a block diagram of an additional exemplary system for efficiently downgrading operating systems installed on network devices.

The following will provide, with reference to FIGS. 1 and 2, detailed descriptions of exemplary systems for efficiently downgrading operating systems installed on network devices. Detailed descriptions of corresponding computer-implemented methods will be provided in connection with FIG. 3. Detailed descriptions of an exemplary active set of packages and an exemplary pending set of packages will be provided in connection with FIG. 4. Detailed descriptions of an exemplary reclassification process will be provided in connection with FIG. 5. In addition, detailed descriptions of an exemplary computing system will be provided in connection with FIG. 6.

FIG. 1 is a block diagram of an exemplary system 100 for efficiently downgrading operating systems installed on network devices. As illustrated in this figure, exemplary system 100 may include one or more modules 102 for performing one or more tasks. As will be explained in greater detail below, modules 102 may include a receiving module 104, a reboot module 106, and a downgrade module 108. Although illustrated as separate elements, one or more of modules 102 in FIG. 1 may represent portions of a single module or application (e.g., a package system that facilitates upgrading and/or downgrading operating system versions on a network device).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network node 202 and/or server 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficiently downgrading operating systems installed on network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more requests, such as request 120. Request 120 generally represents any type or form of computer computer-implemented command that facilitates accessing, modifying, removing, and/or executing a resource on a computing device. In one example, request 120 may initiate and/or be directed to downgrading a first version of an operating system to a second version of an operating system.

As illustrated in FIG. 1, exemplary system 100 may also include certain sets of packages, such as active set of packages 122 and pending set of packages 124. The term "set of packages," as used herein, generally refers to any grouping of software packages that represent, constitute, and/or are incorporated in a certain version of an operating system. Active set of packages 122 generally represent a set of packages that are currently active at the present time. Pending set of packages 124 generally represents a set of packages that are not currently active but are awaiting activation during a reboot. In some examples, active set of packages 122 and pending set of packages 124 may be installed and/or present on a network device at the same time. Active set of packages 122 and pending set of packages 124 may each include and/or represent eXtensive Markup Language (XML) packages that contain one or more scripts.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network node 202 in communication with a server 206 via a network 204. In one example, all or a portion of the functionality of modules 102 may be performed by network node 202, server 206, and/or any other suitable computing system. As will be described in greater detail below, one or more of modules 102 from FIG. 1 may, when executed by at least one processor of network node 202 and/or server 206, enable network node 202 and/or server 206 to efficiently downgrade the operating system installed on network node 202.

Network node 202 generally represents any type or form of computing device capable of reading computer-executable instructions. In one example, network node 202 may include and/or represent a router (such as a provider edge router, a hub router, a spoke router, an autonomous system boundary router, and/or an area border router). Additional examples of network node 202 include, without limitation, switches, hubs, modems, bridges, repeaters, gateways, multiplexers, network adapters, network interfaces, network racks, chasses, servers, portions of one or more of the same, combinations or variations of one or more of the same, and/or any other suitable network device.

Server 206 generally represents any type or form of computing device capable of maintaining, providing, and/or distributing packages that enable network devices to update and/or downgrade their operating systems. In one example, server 206 may include and/or represent a web server that distributes, on an as-needed basis, packages to network devices undergoing operating system updates. Additional examples of server 206 include, without limitation, security servers, application servers, storage servers, and/or database servers configured to run certain software applications and/or provide various security, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between network node 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Packages 220(1)-(N) each generally represent any type or form of software capable of performing and/or contributing to operating system updates or downgrades on network devices. In one example, some of packages 220(1)-(N) may enable network node 202 to update or downgrade its operating system. However, some of packages 220(1)-(N) may be irrelevant to and/or unnecessary for network node 202 to achieve the desired update or downgrade. Some of packages 220(1)-(N) may represent at least a portion of a patch and/or update that, when installed on a network device, brings the network device's operating system to a desired or improved condition and/or configuration. Additionally or alternatively, some of packages 220(1)-(N) may represent at least a portion of a downgrade that, when installed on a network device, reverts the network device's operating system to an earlier version and/or release.

Figure 3:
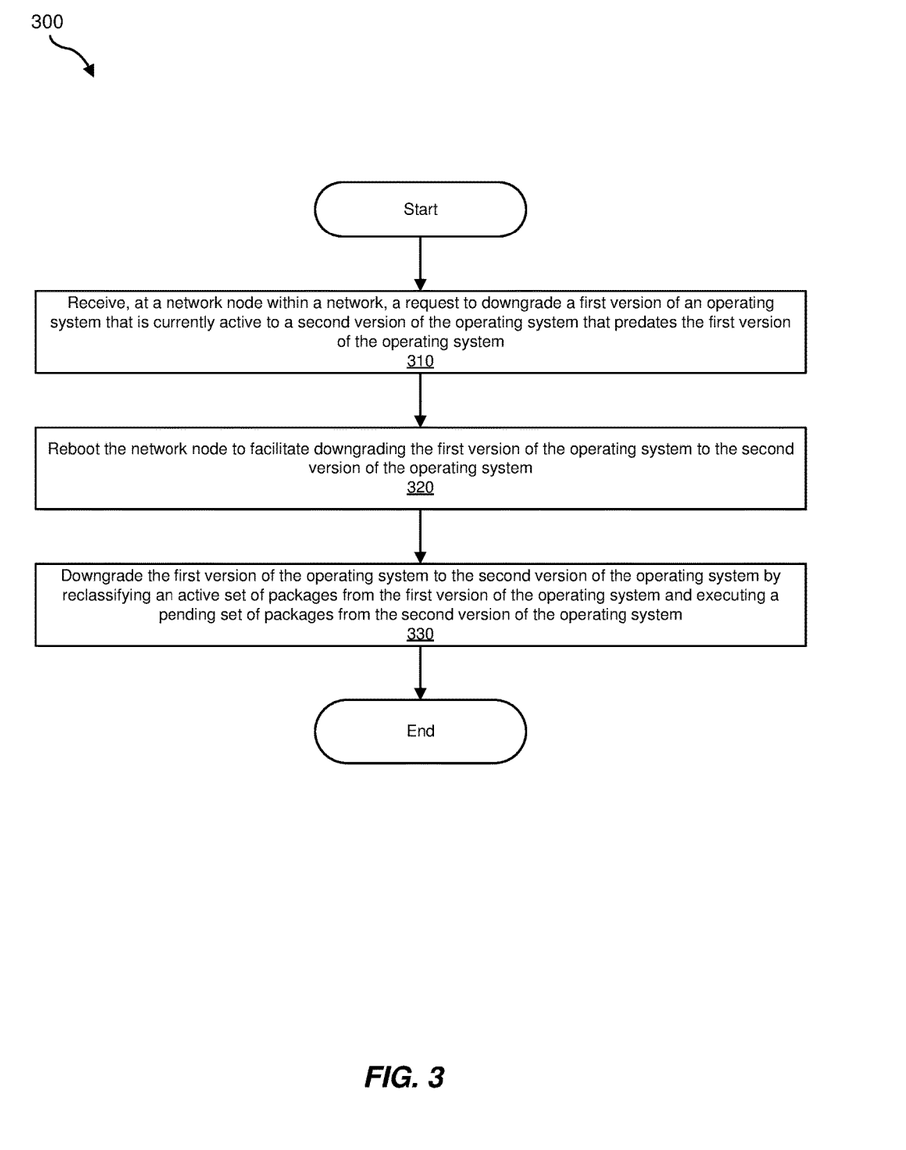
FIG. 3 is a flow diagram of an exemplary method for efficiently downgrading operating systems installed on network devices.

FIG. 3 is a flow diagram of an example computer-implemented method 300 for efficiently downgrading operating systems installed on network devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at a network node within a network, a request to downgrade a first version of an operating system that is currently active to a second version of the operating system that predates the first version of the operating system. For example, receiving module 104 may, as part of network node 202, receive a request 120 to downgrade a first version of an operating system that is currently active on network node 202. In this example, request 120 may direct network node 202 to downgrade the operating system to a second version that predates the first version. In other words, the second version of the operating system may include and/or represent an earlier or previous release of the operating system, and the first version of the operating system may include and/or represent a later or subsequent release of the operating system. The term "downgrade" and the phrase "to downgrade," as used herein, generally refer to any process that reverts software installed on a computing device back to a previous, earlier, and/or older version.

The systems described herein may perform step 310 in a variety of different ways and/or contexts. In some examples, receiving module 104 may receive request 120 in response to user input. For example, a user operating network node 202, server 206, and/or another computing system (not necessarily illustrated in FIG. 2) may provide user input that is intended to revert and/or roll back the operating system of network node 202 to an earlier version. This user input may direct network node 202, server 206, and/or the other computing system to create and/or generate request 120. In this example, once request 120 reaches network node 202, receiving module 104 may detect and/or receive request 120.

In some examples, receiving module 104 may receive request 120 from a remote host that is responsible for managing upgrades and/or downgrades of the operating system running on network node 202. For example, server 206 may include and/or represent a remote host that is responsible for managing upgrades and/or downgrades of the operating system running on network node 202. In the event that the first version of the operating system has caused one or more unintended negative effects on network node 202, server 206 may issue request 120 and/or send the same to network node 202 in an effort to revert the operating system to a more stable and/or better-performing state.

As illustrated in FIG. 3, at step 320 one or more of the systems described herein may reboot the network node to facilitate downgrading the first version of the operating system to the second version of the operating system. For example, reboot module 106 may, as part of network node 202, reboot network node 202 to facilitate downgrading the first version of the operating system to the second version of the operating system. The term "reboot" and the phrase "to reboot," as used herein, generally refer to any process that causes a network device to execute a boot process anew and/or reload an operating system installed on the network device.

The systems described herein may perform step 320 in a variety of different ways and/or contexts. In some examples, reboot module 106 may reboot network node 202 by restarting network node 202. In one example, reboot module 106 may reboot network node 202 by powering off network node 202 and then powering on the same. Additionally or alternatively, reboot module 106 may reboot network node 202 by way of a hard reboot, soft reboot, cold reboot, or warm reboot.

As illustrated in FIG. 3, at step 330 one or more of the systems described herein may downgrade the first version of the operating system to the second version of the operating system during the reboot. For example, downgrade module 108 may, as part of network node 202, downgrade the first version of the operating system to the second version of the operating system during the reboot. In this example, the downgrade may involve (1) reclassifying an active set of packages from the first version of the operating system as a previous set of packages and (2) executing a pending set of packages from the second version of the operating system.

The systems described herein may perform step 330 in a variety of different ways and/or contexts. In some examples, downgrade module 108 may facilitate and/or perform the downgrade by deactivating certain packages from the first version of the operating system and/or activating certain packages from the second version of the operating system. For example, network node 202 may have both active set of packages 122 and pending set of packages 124 installed at the same time. In this example, downgrade module 108 may identify active set of packages 122 from the first version of the operating system and/or pending set of packages 124 from the second version of the operating system. Active set of packages 122 and pending set of packages 124 may have and/or share some packages in common. In other words, some packages may be included and/or represent part of both active set of packages 122 and pending set of packages 124.

Continuing with this example, downgrade module 108 may identify one or more packages within active set of packages 122 that are not included in pending set of packages 124. Downgrade module 108 may then deactivate and/or reclassify those packages by renaming and/or relabeling them as a previous set of packages. Similarly, downgrade module 108 may identify one or more packages within pending set of packages 124 that are not included in active set of packages 122. Downgrade module 108 may then activate and/or reclassify those packages by renaming and/or relabeling them as part of the active set of packages.

In some examples, downgrade module 108 may identify the creation and/or release dates of the first and second versions of the operating system. For example, downgrade module 108 may search metadata associated with the first and second versions of the operating system for their respective creation and/or release dates. During this search, downgrade module 108 may identify the respective creation and/or release dates of the first and second versions of the operating system.

In some examples, downgrade module 108 may compare the creation and/or release dates of the first and second versions of the operating system to one another. Downgrade module 108 may then determine that the second version of the operating system predates the first version of the operating system based at least in part on this comparison. As a result, downgrade module 108 may know and/or determine that request 120 is directed to a downgrade rather than an upgrade.

Additionally or alternatively, downgrade module 108 may search metadata associated with the first and second versions of the operating system for their respective version and/or release numbers. During this search, downgrade module 108 may identify the version and/or release numbers that represent and/or correspond to the first and second versions of the operating system. Downgrade module 108 may then determine that the second version of the operating system predates the first version of the operating system based at least in part on this comparison. As a result, downgrade module 108 may know and/or determine that request 120 is directed to a downgrade rather than an upgrade.

Upon determining that request 120 is directed to a downgrade, downgrade module 108 may search metadata associated with the packages to be deactivated as part of the downgrade for any downgrade actions that need to be performed to successfully revert and/or roll back the operating system to the second version. During this search, downgrade module 108 may identify one or more downgrade actions of those packages from the first version of the operating system. Downgrade module 108 may then perform those downgrade actions to facilitate successfully reverting and/or rolling back network node 202 to a state that is compatible with the second version of the operating system. Additionally or alternatively, downgrade module 108 may direct those packages from the first version to perform their respective downgrade actions.

In some examples, a downgrade action may include and/or represent any type or form of task and/or operation that undoes a configuration change made by an earlier upgrade to the operating system installed on network node 202. This configuration change may have been made by the corresponding package that is being deactivated. In addition, this configuration change may not be backwards compatible with the second version of the operating system. Examples of such downgrade actions include, without limitation, requiring certain software, installing certain software, activating certain software, deactivating certain software, deleting certain software, mounting certain software, unmounting certain software, combinations or variations of one or more of the same, and/or any other suitable downgrade actions.

In some examples, downgrade module 108 may execute pending set of packages 124 from the second version of the operating system. For example, downgrade module 108 may activate and/or apply pending set of packages 124 from the second version of the operating system such that network node 202 boots from pending set of packages 124. In other words, by activating and/or applying pending set of packages 124 during the reboot, downgrade module 108 may effectively cause the bootloader to load pending set of packages 124 and then boot network node 202 from those packages.

Figure 4:
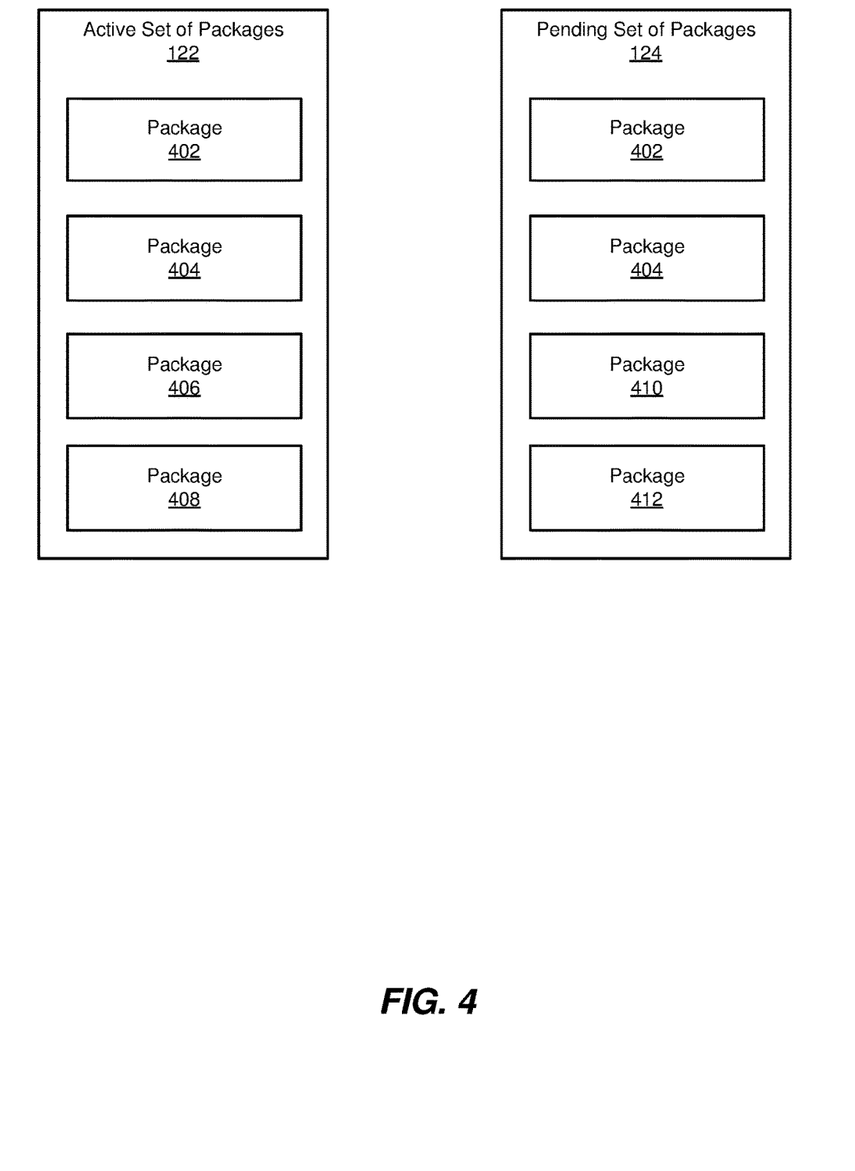
FIG. 4 is a block diagram of an exemplary active set of packages from a first version of an operating system and an exemplary pending set of packages from a second version of the operating system.

As a specific example, network node 202 may have both active set of packages 122 in FIG. 4 and pending set of packages 124 in FIG. 4 installed simultaneously and/or at the same point in time. In this example, the active set of packages 122 may correspond to and/or represent part of the first version of the operating system, and pending set of packages 124 may correspond to and/or represent part of the second version of the operating system. As illustrated in FIG. 4, active set of packages 122 may include packages 402, 404, 406, and 408, and pending set of packages 124 may include packages 402, 404, 410, and 412. While active set of packages 122 and 124 may both be installed on network device 202 at the current point in time, network node 202 may currently be running only the first version of the operating system, which includes active set of packages 122.

Continuing with this example, receiving module 104 may receive a request to downgrade the first version of the operating system to the second version of the operating system. In response to that request, reboot module 106 may reboot network node 202 to facilitate downgrading the first version of the operating system to the second version of the operating system. During the reboot, downgrade module 108 may downgrade the first version of the operating system to the second version of the operating system by (1) deactivating active set of packages 122 and/or reclassifying active set of packages 122 as a previous set of packages and then (2) activating pending set of packages 124 and/or booting network node 202 from pending set of packages.

Figure 5:
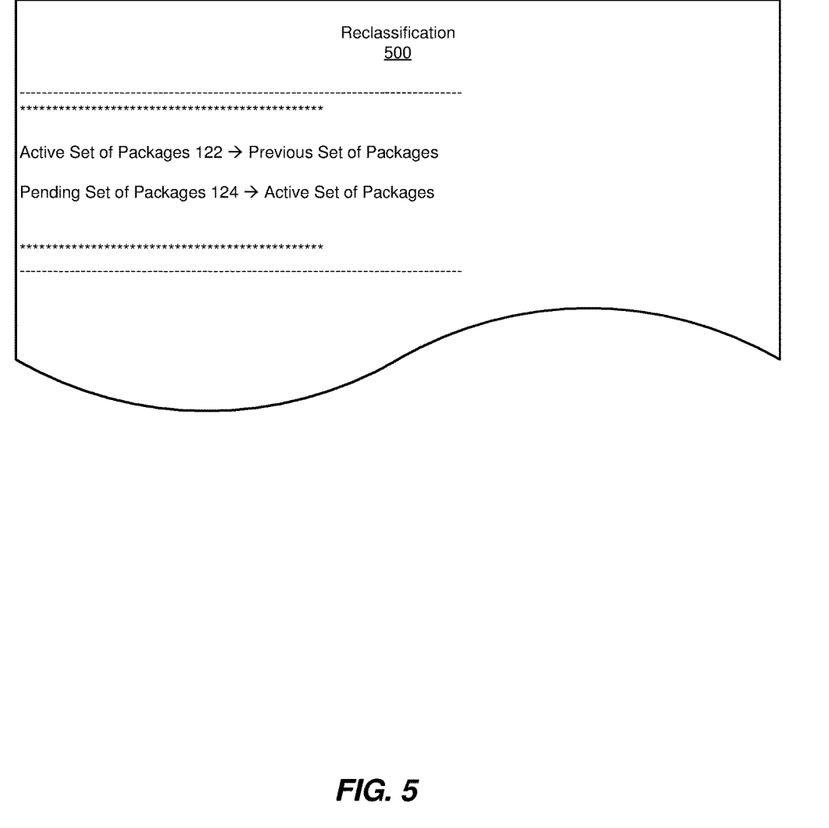
FIG. 5 is an illustration of an exemplary reclassification of certain packages from different versions of an operating system.

Since, in this example, packages 402 and 404 are included in both active set of packages 122 and pending set of packages 124, packages 402 and 404 may remain active before and after the downgrade. In other words, packages 402 and 404 may not be deactivated and/or reclassified during the downgrade. Accordingly, in this example, downgrade module 108 may effectively perform reclassification 500 in FIG. 5. As illustrated in FIG. 5, reclassification 500 may involve reclassifying active set of packages 122 as a previous set of packages and reclassifying pending set of packages 124 as the new active set of packages. Network node 202 may then boot up from pending set of packages 124, which have just been activated, thus completing the downgrade.

Figure 6:
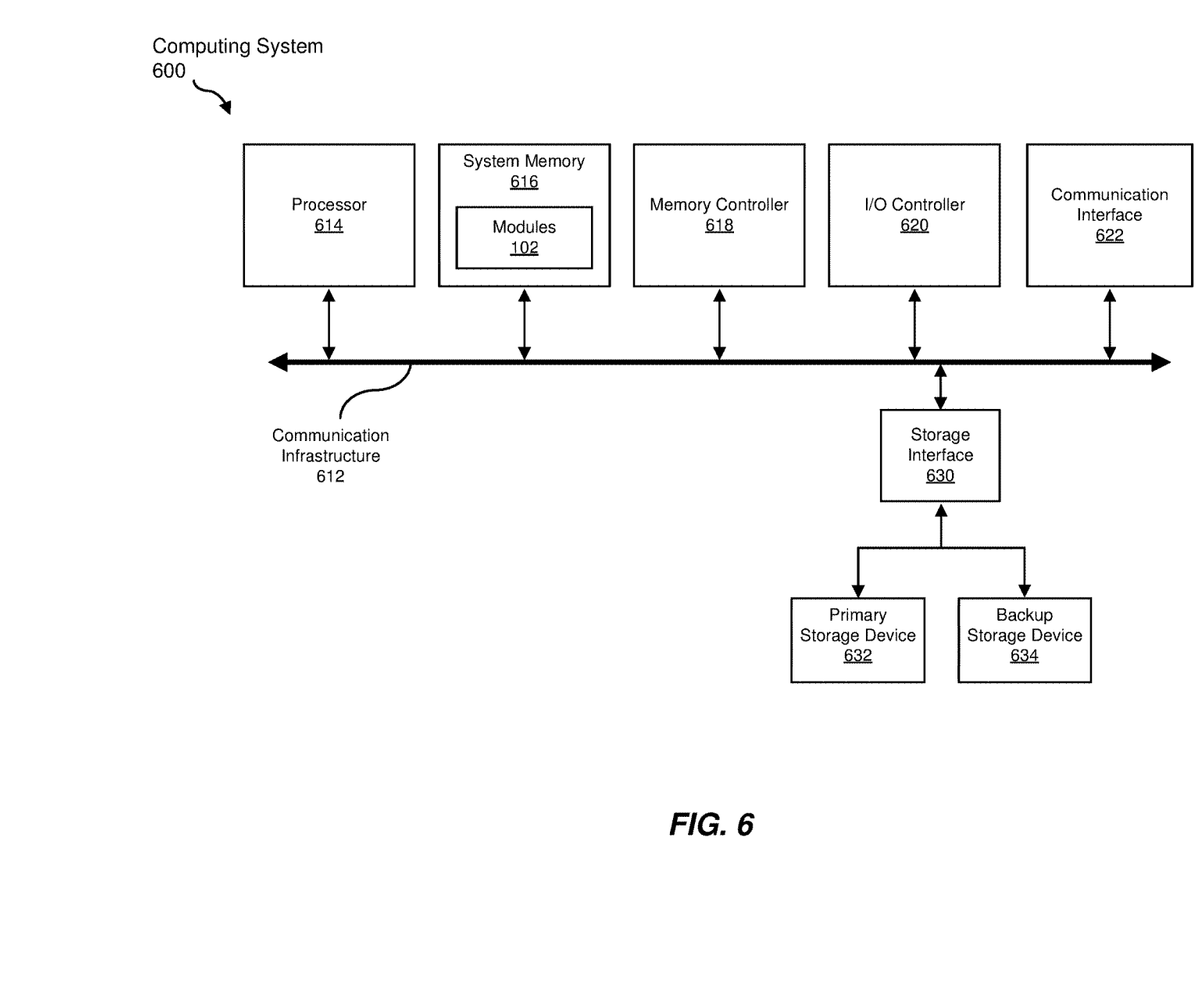
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include and/or store all or a portion of modules 102 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a network node within a network, a request to downgrade a first version of an operating system that is currently active to a second version of the operating system that predates the first version of the operating system;
   searching metadata associated with an active set of packages from the first version of the operating system for any downgrade actions that need to be performed to successfully revert the operating system from the first version to the second version;
   during the search, identifying at least one downgrade action of at least one package within the active set of packages from the first version of the operating system, wherein the downgrade action comprises undoing at least one configuration change to the network node that:
      was made by the package within the active set of packages from the first version of the operating system; and
      is not backwards compatible with the second version of the operating system;
   determining that at least one additional configuration change made to the network node by at least one package within the active set of packages from the first version of the operating system is backwards compatible with the second version of the operating system;
   rebooting the network node to facilitate downgrading the first version of the operating system to the second version of the operating system; and
   during the reboot, downgrading the first version of the operating system to the second version of the operating system by:
      deactivating the active set of packages by renaming the active set of packages from the first version of the operating system as a previous set of packages;
      performing the downgrade action to revert the network node to a state that is compatible with the second version of the operating system by undoing the configuration change;
      maintaining the additional configuration change intact due at least in part to the additional configuration change being backwards compatible with the second version of the operation system; and
      executing a pending set of packages from the second version of the operating system.

2. The method of claim 1, wherein downgrading the first version of the operating system to the second version of the operating system comprises:
   identifying a creation date of the first version of the operating system;
   identifying a creation date of the second version of the operating system;
   comparing the creation date of the first version of the operating system with the creation date of the second version of the operating system;
   determining, based at least in part on the comparison, that the second version of the operating system predates the first version of the operating system; and
   determining that the request is directed to a downgrade rather than an upgrade due at least in part to the second version of the operating system predating the first version of the operating system.

3. The method of claim 1, wherein downgrading the first version of the operating system to the second version of the operating system comprises reclassifying the pending set of packages from the second version of the operating system as the active set of packages.

4. The method of claim 1, wherein executing the pending set of packages from the second version of the operating system comprises activating the pending set of packages from the second version of the operating system such that the network node boots from the pending set of packages.

5. The method of claim 1, wherein the active set of packages from the first version of the operating system and the pending set of the packages from the second version of the operating system share some packages in common.

6. The method of claim 1, wherein downgrading the first version of the operating system to the second version of the operating system comprises:
   identifying at least one package within the active set of packages from the first version of the operating system that is not included in the pending set of packages from the second version of the operating system; and
   deactivating the package within the active set of packages that is not included in the pending set of packages.

7. A system comprising:
   a receiving module, stored in memory, that receives, at a network node within a network, a request to downgrade a first version of an operating system that is currently active to a second version of the operating system that predates the first version of the operating system;
   a downgrade module, stored in memory, that:
      searches metadata associated with an active set of packages from the first version of the operating system for any downgrade actions that need to be performed to successfully revert the operating system from the first version to the second version;
      identifies, during the search, at least one downgrade action of at least one package within the active set of packages from the first version of the operating system, wherein the downgrade action comprises undoing at least one configuration change to the network node that:
         was made by the package within the active set of packages from the first version of the operating system; and
         is not backwards compatible with the second version of the operating system;

determines that at least one additional configuration change made to the network node by at least one package within the active set of packages from the first version of the operating system is backwards compatible with the second version of the operating system;
a reboot module, stored in memory, that reboots the network node to facilitate downgrading the first version of the operating system to the second version of the operating system;
a downgrade module, stored in memory, that downgrades the first version of the operating system to the second version of the operating system during the reboot by:
deactivating the active set of packages by renaming the active set of packages from the first version of the operating system as a previous set of packages;
performing the downgrade action to revert the network node to a state that is compatible with the second version of the operating system by undoing the configuration change;
maintaining the additional configuration change intact due at least in part to the additional configuration change being backwards compatible with the second version of the operation system; and
executing a pending set of packages from the second version of the operating system; and
at least one physical processor that executes the receiving module, the reboot module, and the downgrade module.

8. The system of claim 7, wherein the downgrade module:
identifies a creation date of the first version of the operating system;
identifies a creation date of the second version of the operating system;
compares the creation date of the first version of the operating system with the creation date of the second version of the operating system;
determines, based at least in part on the comparison, that the second version of the operating system predates the first version of the operating system; and
determines that the request is directed to a downgrade rather than an upgrade due at least in part to the second version of the operating system predating the first version of the operating system.

9. The system of claim 7, wherein the downgrade module reclassifies the pending set of packages from the second version of the operating system as the active set of packages.

10. The system of claim 7, wherein the downgrade module activates the pending set of packages from the second version of the operating system such that the network node boots from the pending set of packages.

11. The system of claim 7, wherein the active set of packages from the first version of the operating system and the pending set of the packages from the second version of the operating system share some packages in common.

12. The system of claim 7, wherein the downgrade module:
identifies at least one package within the active set of packages from the first version of the operating system that is not included in the pending set of packages from the second version of the operating system; and
deactivates the package within the active set of packages that is not included in the pending set of packages.

13. A non-transitory computer-readable medium comprising one or more computer-executable instructions that, when executed by at least one processor of a computing device, cause the computing device to:
receive, at a network node within a network, a request to downgrade a first version of an operating system that is currently active to a second version of the operating system that predates the first version of the operating system;
search metadata associated with an active set of packages from the first version of the operating system for any downgrade actions that need to be performed to successfully revert the operating system from the first version to the second version;
identify, during the search, at least one downgrade action of at least one package within the active set of packages from the first version of the operating system, wherein the downgrade action comprises undoing at least one configuration change to the network node that:
was made by the package within the active set of packages from the first version of the operating system; and
is not backwards compatible with the second version of the operating system;
determine that at least one additional configuration change made to the network node by at least one package within the active set of packages from the first version of the operating system is backwards compatible with the second version of the operating system;
reboot the network node to facilitate downgrading the first version of the operating system to the second version of the operating system; and
downgrade, during the reboot, the first version of the operating system to the second version of the operating system by:
deactivating the active set of packages by renaming the active set of packages from the first version of the operating system as a previous set of packages;
performing the downgrade action to revert the network node to a state that is compatible with the second version of the operating system by undoing the configuration change;
maintaining the additional configuration change intact due at least in part to the additional configuration change being backwards compatible with the second version of the operation system; and
executing a pending set of packages from the second version of the operating system.

14. The non-transitory computer-readable medium of claim 13, wherein the computer-executable instructions, when executed by the processor of the computing device, further cause the computing device to:
identify a creation date of the first version of the operating system;
identify a creation date of the second version of the operating system;
compare the creation date of the first version of the operating system with the creation date of the second version of the operating system;
determine, based at least in part on the comparison, that the second version of the operating system predates the first version of the operating system; and
determine that the request is directed to a downgrade rather than an upgrade due at least in part to the second version of the operating system predating the first version of the operating system.

* * * * *